July 12, 1932.   A. RASMUSSEN ET AL   1,867,376
AUTOMATIC CONTROLLER
Filed Feb. 20, 1928
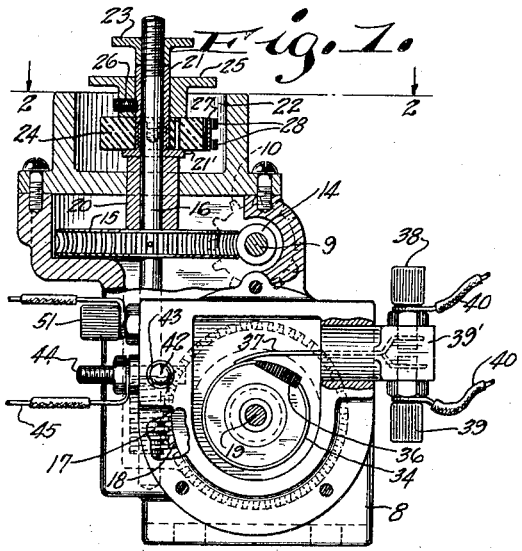
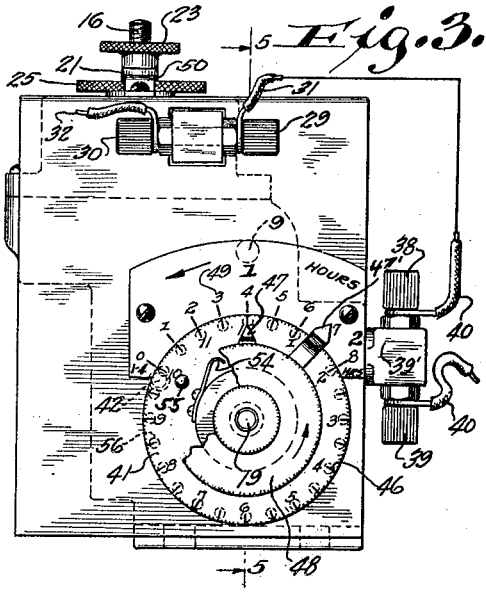
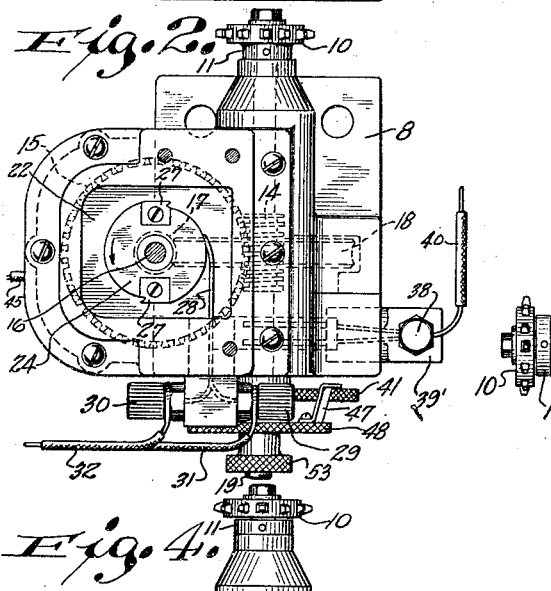
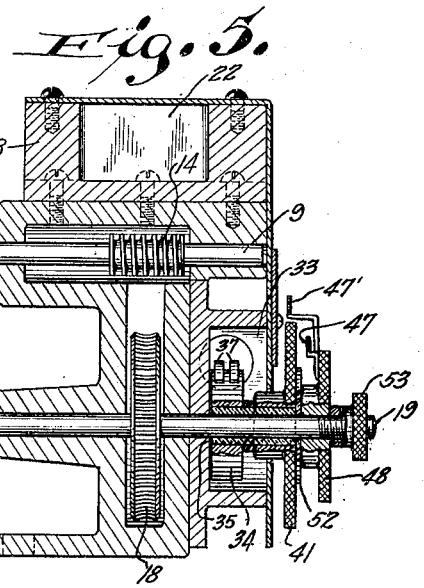
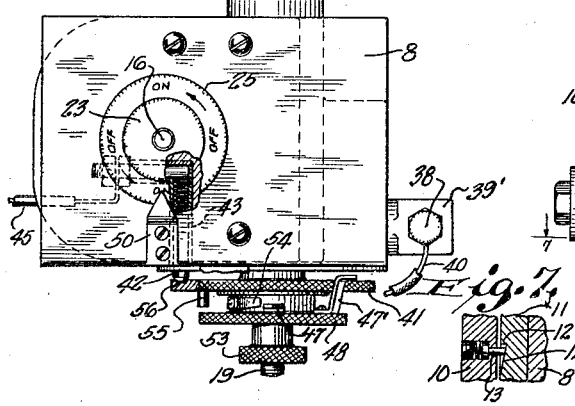
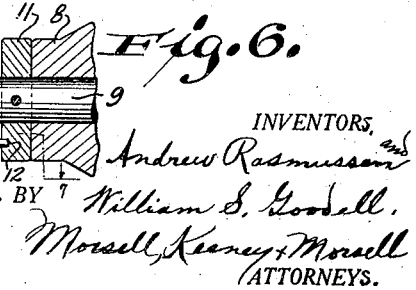
INVENTORS,
Andrew Rasmussen and
William S. Goodell.
BY Morsell, Keeney & Morsell
ATTORNEYS.

Patented July 12, 1932

1,867,376

UNITED STATES PATENT OFFICE

ANDREW RASMUSSEN AND WILLIAM S. GOODELL, OF RACINE, WISCONSIN

AUTOMATIC CONTROLLER

Application filed February 20, 1928. Serial No. 255,663.

This invention relates to improvements in automatic controllers, particularly, although not solely adapted for controlling barbecue machines.

Barbecue machines of the better class now in use are adapted to cook a plurality of pieces of meat or other material at the same time, which are revolving in front of an open fire. As it requires several hours to cook each piece of material, it is desirable to provide automatic means to control the cooking period.

It is one of the objects of this invention to provide an automatic control which will stop the further cooking of the material when the same has been cooked for the desired period.

A further object of the invention is to provide an automatic controller which will automatically control the basting of the pieces of meat at certain predetermined periods of time.

A further object of the invention is to provide an automatic controller which may be adjusted to start basting after a predetermined period and then continue with intermitting basting.

A further object of the invention is to provide an automatic controller which will stop further cooking and give an alarm when the pieces of material have been cooked a predetermined period of time.

A further object of the invention is to provide an automatic controller which is of simple construction, is strong and durable, and is well adapted for the purpose desired.

With the above and other objects in view, the invention relates to the improved automatic controller and its parts and combinations as set forth in the claims, and all equivalents thereof.

In the accompanying drawing in which the same reference letters indicate the same parts in all of the views:

Fig. 1 is a side view of the automatic controller with some of the parts broken away and other parts being shown in section;

Fig. 2 is a top sectional view taken on line 2—2 of Fig. 1;

Fig. 3 is a side view with parts broken away to show other parts in the rear thereof;

Fig. 4 is a top view of the controller with some of the binding posts being omitted to show parts below;

Fig. 5 is a vertical sectional view thereof taken on line 5—5 of Fig. 3;

Fig. 6 is a sectional detail view of parts shown in Fig. 5; and

Fig. 7 is a sectional detail view taken on line 7—7 of Fig. 6.

Referring to the drawing, the numeral 8 indicates a casing or frame in which is journaled a main driven shaft 9 having a sprocket wheel 10 loosely mounted on the outer end thereof. A collar 11 mounted fast on the driven shaft 9 adjacent the inner side of the sprocket wheel 10 is provided with an inclined clutch recess 12 to form a shoulder 12' which is adapted to be engaged by a spring actuated clutch pin 13 mounted in the sprocket wheel 10. The inclination of the recess 12 is such that the sprocket wheel 10 will only rotate the shaft 10 when the wheel is turned in one direction. The driven shaft 9 within the casing is formed with a worm 14 which is in engagement with a worm wheel 15 mounted fast on the vertical shaft 16 journaled in the casing 8. The said vertical shaft 16 at a lower plane is also provided with a worm 17 which engages a worm wheel 18 mounted on the timer shaft 19.

The vertical shaft 16 extends upwardly through a chamber in the casing and is provided with a spacer sleeve 20 and a shouldered sleeve 21 loosely mounted on the shaft 16 and partly within the chamber 22 of the casing. A thumb nut 23 is threaded on the upper end portion of the vertical shaft 16 and bears downwardly on the shoulder 21' of the sleeve 21 to adjustably clamp the shouldered sleeve and the first mentioned sleeve to the worm wheel 15 when desired. An insulating contact wheel 24 pinned to the shouldered sleeve 21 is held in place by a milled edge dial 25 adjustably secured to the shoulder sleeve by a set screw 26. The insulating wheel 24 is of a double cam shape and is provided with two contact members 27 mounted thereon, which extend over the periphery thereof on opposite side edges of the wheel. Contact fingers 28 mounted within the chamber 22 and bearing against the periphery of the wheel 24 are adapted to engage one of the contact members each half revolution of the wheel to form an electrical connection between the contact fingers 28. The opposite ends of said fingers are connected respectively to binding posts 29 and 30, and wires 31 and 32 connected respectively to the binding posts 29 and 30, extend respectively to the binding post 38 and to the controlling device which controls the basting period. The top dial has two positions which indicate the rotation of the contact hour cam wheel 24 for making and breaking the circuit to the basting pump. If it is desired to stop or to baste continuously the top nut 23 is loosened to prevent rotation of the insulating wheel 24 when the metal parts 27 are in contact with or out of contact with said metal fingers 28.

The portion of the casing 8 through which the timer shaft 19 extends is provided with a chamber 33 for receiving a metal faced contact wheel 34 mounted fast on an insulating sleeve 35 surrounding the timer shaft 19. The timer wheel 34 is provided with an insulated section 36 to insulate a peripheral portion of the wheel. Two contact fingers 37 mounted in the chamber 33 contact with the periphery of the wheel 34 to form an electrical connection between the fingers when said fingers are out of engagement with the insulated section and rest on the metal portion of the wheel. Said fingers are connected to binding posts 38 and 39 mounted on the outer insulated part 39' of the casing. The wire 40 may be connected to the binding post 29 by connection with the wire 31 if desired. The other binding post 39 and its wire 40 may be connected to an alarm means or to a device controlling the basting or cooking of the meat or other material. A large timer dial 41 is rigidly mounted on the outer end portion of the insulating sleeve 35 and is adapted to have its inner face electrically contact with a spring actuated pin 42 mounted in the casing and insulated therefrom by an insulating sleeve 43.

The movable contact pin 42 coacts with the outer end of a compression spring the inner end of which is connected to a binding post 44 which projects outwardly from the casing 8 and is connected to an electrical conductor 45 leading to the cooking or roasting control alarm (not shown).

The peripheral outer portion of the large timer dial 41 is provided with a graduated scale 46 with which a short pointer 47 mounted upon a smaller dial 48, is adapted to cooperate. The arrangement is such that when the timer dial 41 is revolved to cause a predetermined graduation of the scale 46 to register with the pointer 47, the machine will actuate an alarm as soon as the period of time corresponding to the predetermined setting has elapsed, thus insuring cooking or roasting for only the desired period.

The small dial 48 is likewise provided with a long pointer 47' which cooperates with a semi-circular scale 49 on the casing 8 comprising equi-spaced numerals ranging from 0 to 8 so as to designate quarter hourly basting periods, and as illustrated in the drawing the pointer 47' is set for a one and three quarter hour basting period. By setting the long pointer 47' in register with the figure 7 of the casing as shown, the basting control portion of the device would start basting as soon as the rotation of the dial 41 moved the insulating section out of contact with the fingers 37, in seven quarter hours or one hour and three quarters. If it is desired to intermittently baste the meat the thumb nut 23 is turned downwardly to clamp the contact wheel 24 to the shaft 16 and thereby rotate said contact wheel 24. If, however, a continuous basting is required the thumb nut is loosened with the contact fingers 28 resting on one of the contact members 27 to form a continuous circuit between the fingers. It is to be understood that during the cooking period without basting the fingers 37 rest upon the insulating strips 36 and that during basting the said fingers will disengage said strip 36 and rest upon the metal portion of the wheel 36.

The dial 25 is provided with words indicating two opposite "on" positions and at right angles thereto two opposite "off" positions and the dial may be turned to register either one of said positions with a pointer 50 mounted on the casing as clearly shown in Fig. 4.

Binding posts 51 projecting from the casing provide a ground connection for the casing and also for parts which are grounded on the casing.

While the timer wheel 34 and the dial 41 are insulated from shaft 19, the small timer dial 48 is directly mounted on the shaft 19 and insulated from the dial 41 by an insulating washer 52. A thumb nut 53 threaded on the outer end of the shaft 19 is adapted to clamp the smaller dial 48 in adjusted position to the insulating sleeve 35 and the shaft 19. The hub of the small dial is provided with a yielding contact 54 which is arranged to contact with the pin contact 55 and form an electrical connection therebetween when the small dial moves the predetermined distance the wheel is set, to sound an alarm when the cooking period has been reached. When the small dial reaches the point for which it was set its yielding contact 54 will contact with the pin contact 55 and complete the alarm circuit.

To maintain the large dial 41 in adjusted position, its inner face is provided with a circumferential line of recesses 56 into which the yielding contact pin 42 extends and forms an electrical connection therewith.

In operation, the automatic controller is electrically connected up to the barbecue machine and the large pointer 47' is turned to register with the casing number indicating the time after starting the cooking, it is desired to start basting. The large timer dial 41 is then turned to register its number indicating the desired cooking period with the short pointer 47, and in which position the contact finger 37 is resting upon the insulation 36. When the start of the basting period has been reached by the contact fingers 37 sliding off the insulating section 36 and engaging the metal of the contact wheel 34, the two fingers will be electrically connected together, thus completing the circuit to the fingers 28, and when these fingers intermittently contact with the contacts 27 the circuit will be completed to operate a basting pump or other device. The basting will then continue for the balance of the cooking period, unless the thumb nut 23 is turned to prevent the rotation of the wheel 24 with the fingers 28 resting on the insulating portion of the wheel 24. If the fingers 28 rest upon one of the contact portions 27, the basting will be continuous. The small insulated dial 48 will continue to revolve until the contact 54 eventually coacts with the pin 55 and completes the electric circuit through the conductors 40, 45 for energizing the signal or alarm, thus indicating to the operator that the cooking period has terminated.

While the automatic control has been described in connection with a barbecue machine, it is to be understood that the device is adapted for many other uses.

What we claim as our invention is:

1. An automatic controller, comprising a casing, a driven shaft journaled therein and having a worm forming part thereof, a second shaft journaled in the casing at right angles to the first mentioned shaft and having a worm wheel in mesh with the worm, a third shaft journaled in the casing and extending parallel to the first shaft and having a worm wheel in mesh with a worm forming part of the second shaft, a shouldered sleeve loosely mounted on the driven shaft, an electric make and break wheel formed in part of insulating material and mounted fast on the sleeve, means for adjustably clamping the sleeve to the second shaft, metal contacts mounted on opposite peripheral portions of the insulating wheel, contact fingers mounted on the casing and insulated therefrom and each other and engaging the peripheral portion of the insulating wheel, an insulating sleeve mounted fast on the third shaft, an insulating wheel mounted fast on the insulating sleeve and having a metal band covering a portion of the periphery of said wheel, and contact fingers mounted on and insulated from the casing and each other and engageable with the peripheral portion of the insulating wheel to form an electrical contact between the fingers.

2. An automatic controller, comprising a casing, a driven shaft journaled therein and having a worm forming part thereof, a second shaft journaled in the casing at right angles to the first mentioned shaft and having a worm wheel in mesh with the worm, a third shaft journaled in the casing and extending parallel to the first shaft and having a worm wheel in mesh with a worm forming part of the second wheel, a shouldered sleeve loosely mounted on the driven shaft, an electric make and break wheel formed in part of insulating material and mounted fast on the sleeve, means for adjustably clamping the sleeve to the second shaft, metal contacts mounted on opposite peripheral portions of the insulating wheel, contact fingers mounted on the casing and insulated therefrom and each other and engaging the peripheral portion of the insulating wheel and the metal contacts thereof to control basting periods, an insulating sleeve mounted fast on the third shaft, an insulating wheel mounted fast on the insulating sleeve and having a metal band covering a portion of the periphery of said wheel, contact fingers mounted on and insulated from the casing and each other and engaging the peripheral portion of the insulating wheel and the metal band thereof to control cooking periods, a dial loosely journaled on the third shaft, a smaller dial mounted loosely on the third shaft and having a short pointer which coacts with the first mentioned dial to indicate time periods, a fixed dial mounted on the casing for indicating basting periods, a long pointer mounted on the smaller dial and cooperating with the fixed dial to indicate cooking time periods, means for holding the large dial in adjusted positions, and means for clamping the smaller dial in adjusted positions on the third shaft.

3. An automatic controller, comprising a casing, a driven shaft journaled medially, horizontally therein and having a worm forming part thereof, a driving connection mounted on one end of the shaft, a second shaft mounted in and extending vertically in the casing and having a worm adjacent one end, said second shaft medially of its length having a worm wheel which is in mesh with the worm of the first mentioned shaft, said second shaft also having an insulating shouldered sleeve loosely mounted on its upper portion, an insulating wheel mounted fast on the sleeve and having opposite peripheral contacts, a dial mounted fast on the sleeve, means for clamping the sleeve to the shaft, contact fingers mounted on the frame and insulated therefrom and each other and engaging the contact wheel and the contacts thereof to control basting periods, an insulating sleeve mounted fast on the third shaft and having a contact wheel connected fast to the inner portion of the sleeve, a metal band mounted on the third shaft wheel for the greater portion of the circumference thereof and the balance of the portion being formed of insulating material, contact fingers mounted on the casing and insulated therefrom and each other and engaging the periphery of the wheel and the metal band thereof, a dial loosely mounted on the third shaft sleeve and having spaced recesses in its inner face and designating characters on the outer face thereof, a yielding contact member mounted in the casing and extending into one of the recesses to hold the dial in adjusted position and to form an electrical contact therewith, said dial also having an outwardly projecting pin, a smaller dial mounted loosely on the third shaft and having a short pointer which coacts with the first mentioned dial to indicate time periods, a fixed dial mounted on the casing for indicating basting periods, a long pointer mounted on the smaller dial and cooperating with the fixed dial to indicate cooking time periods, a yielding contact member carried by the smaller dial for engaging the projecting pin of the larger dial to form an electrical connection therebetween, and threaded means for clamping the smaller dial in adjusted position to the third shaft.

In testimony whereof, we affix our signatures.

ANDREW RASMUSSEN.
WILLIAM S. GOODELL.